(12) United States Patent
Khan et al.

(10) Patent No.: US 12,494,998 B2
(45) Date of Patent: Dec. 9, 2025

(54) NETWORK METADATA REPORTING

(71) Applicant: Cisco Technology, Inc., San Jose, CA (US)

(72) Inventors: Amir Khan, Karnataka (IN); Ankit Ashokkumar Kansara, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 558 days.

(21) Appl. No.: 17/833,128

(22) Filed: Jun. 6, 2022

(65) Prior Publication Data

US 2023/0396541 A1    Dec. 7, 2023

(51) Int. Cl.
*H04L 45/74* (2022.01)
*H04L 47/2483* (2022.01)
*H04L 69/22* (2022.01)

(52) U.S. Cl.
CPC .......... *H04L 45/74* (2013.01); *H04L 47/2483* (2013.01); *H04L 69/22* (2013.01)

(58) Field of Classification Search
CPC ...... H04L 45/74; H04L 47/2483; H04L 69/22
See application file for complete search history.

(56) References Cited

U.S. PATENT DOCUMENTS

| 2015/0372910 | A1  | 12/2015 | Janakiraman et al. | |
| 2019/0141168 | A1* | 5/2019  | Bhandari | H04L 43/028 |
| 2019/0222481 | A1* | 7/2019  | Hira | H04L 41/12 |
| 2021/0160275 | A1  | 5/2021  | Anderson et al. | |
| 2021/0243091 | A1  | 8/2021  | Raney et al. | |
| 2021/0385126 | A1* | 12/2021 | Klous | H04L 69/324 |

FOREIGN PATENT DOCUMENTS

| CN | 110213129 A   | 9/2019 |
| WO | 2020125650 A1 | 6/2020 |
| WO | 2021174236 A2 | 9/2021 |

OTHER PUBLICATIONS

Lizhuang Tan, et al. "In-band Network Telemetry: A Survey", Oct. 12, 2021, Research Gate. (Year: 2021).*
Tal Mizrahi, et al. "Network Telemetry Solutions for Data Center and Enterprise Networks", Marvell, white paper. Mar. 2018 (Year: 2018).*
Alvarez et al., "In-band Network Telemetry (INT) Dataplane Specification," In-band Network Telemetry, Version 2.1, Nov. 11, 2020, 56 pages.

(Continued)

*Primary Examiner* — Huy D Vu
*Assistant Examiner* — Robert Ma
(74) *Attorney, Agent, or Firm* — Edell, Shapiro & Finnan, LLC

(57) ABSTRACT

Methods are provided to decrease amount of the telemetry data traversed in a network. The methods involve obtaining, by a first network device, a packet of a traffic flow. The packet has a header and a payload. The methods further involve adding, by the first network device, to the header of the packet, telemetry node level metadata while skipping at least one element of the telemetry node level metadata that is redundant to telemetry node level information of the traffic flow and providing the packet to a second network device in a path of a network.

20 Claims, 10 Drawing Sheets

(56) References Cited

OTHER PUBLICATIONS

F. Brockners, et al., "Data Fields for In-situ OAM draft-ietf-ippm-ioam-data-09," ippm, Internet-Draft, Intended status: Standards Track, Mar. 8, 2020, 43 pages.

Tal Mizrahi, et al., "Network Telemetry Solutions for Data Center and Enterprise Networks," Marvell, White Paper, Mar. 2018, 14 pages.

F. Brockners, et al., "Data Fields for In-situ OAM draft-ietf-ippm-ioam-data-02," ppm, Internet-Draft, Intended status: Standards Track, Mar. 5, 2018, 34 pages.

Lizhuang Tan, et al., "In-band Network Telemetry: A Survey," ResearchGate, Oct. 12, 2021, 26 pages; https://www.researchgate.net/publication/344533358.

* cited by examiner

FIG. 2

| | INT Header | Node-id <32 bits> | Level-1 IngressIntf=Eth1/1 + EgressIntf=Eth1/1 <32 bits> | HopLatency= HOP_LAT_1 <32 bits> | QueueId= Q_id1_Q-occ1 <32 bits> | Ingress Time Stamp <64 bits> | Egress Time Stamp <64 bits> | Level-2 IngressIntf=Logical-Eth1/1 + EgressIntf=Logical-Eth1/1 <64 bits> | EgressPortUtil= EgrPortUtil1 <32 bits> | Buffer Occupancy= Buff-occ1 <32 bits> | Checksum1 |
|---|---|---|---|---|---|---|---|---|---|---|---|
| Packet-1: 172a | | 202 | 204a | 204b | 204c | 204d | 204e | 204f | 204g | 204h | 200 / 204k |
| Packet-2: 172b | | 202 | 204a | 204b | 204c | 210-1 / 204d | 204e | 204f | 204g | 204h | 200 / 210-2 / 204k |
| Packet-3: 172c | | 202 | 204a | 204b | 204c | 210-1 / 204d | 204e | 204f | 204g | 204h | 200 / 210-2 / 204k |
| ...Packet-10: 172m | | 202 | 204a | 204b | 204c | 204d | 204e | 204f | 204g | 204h | 200 / 210-2 / 204k |

130

NETWORK METADATA REPORTING

TECHNICAL FIELD

The present disclosure generally relates to data and communication networks.

BACKGROUND

Services provided to an enterprise often traverse multiple networks and/or are provided in a cloud. Tracking performance and troubleshooting for networking, equipment, and software in these networks is a complex task that requires gathering and analyzing measurement data from various nodes along a network path in a network. For example, In-band Network Telemetry standard (INT) defined by P4 working group or In-Situ Operation, Administration and Maintenance (IOAM) defined by IETF provide mechanisms for collecting measurement data from network nodes along a path in a network.

BRIEF DESCRIPTION OF THE DRAWINGS

FIG. 2 is a diagram illustrating a traffic flow in which the redundant elements are identified so as to be skipped from the telemetry node level metadata set in subsequent packets of a traffic flow, according to an example embodiment.

DESCRIPTION OF EXAMPLE EMBODIMENTS

Overview

Figure 1A:
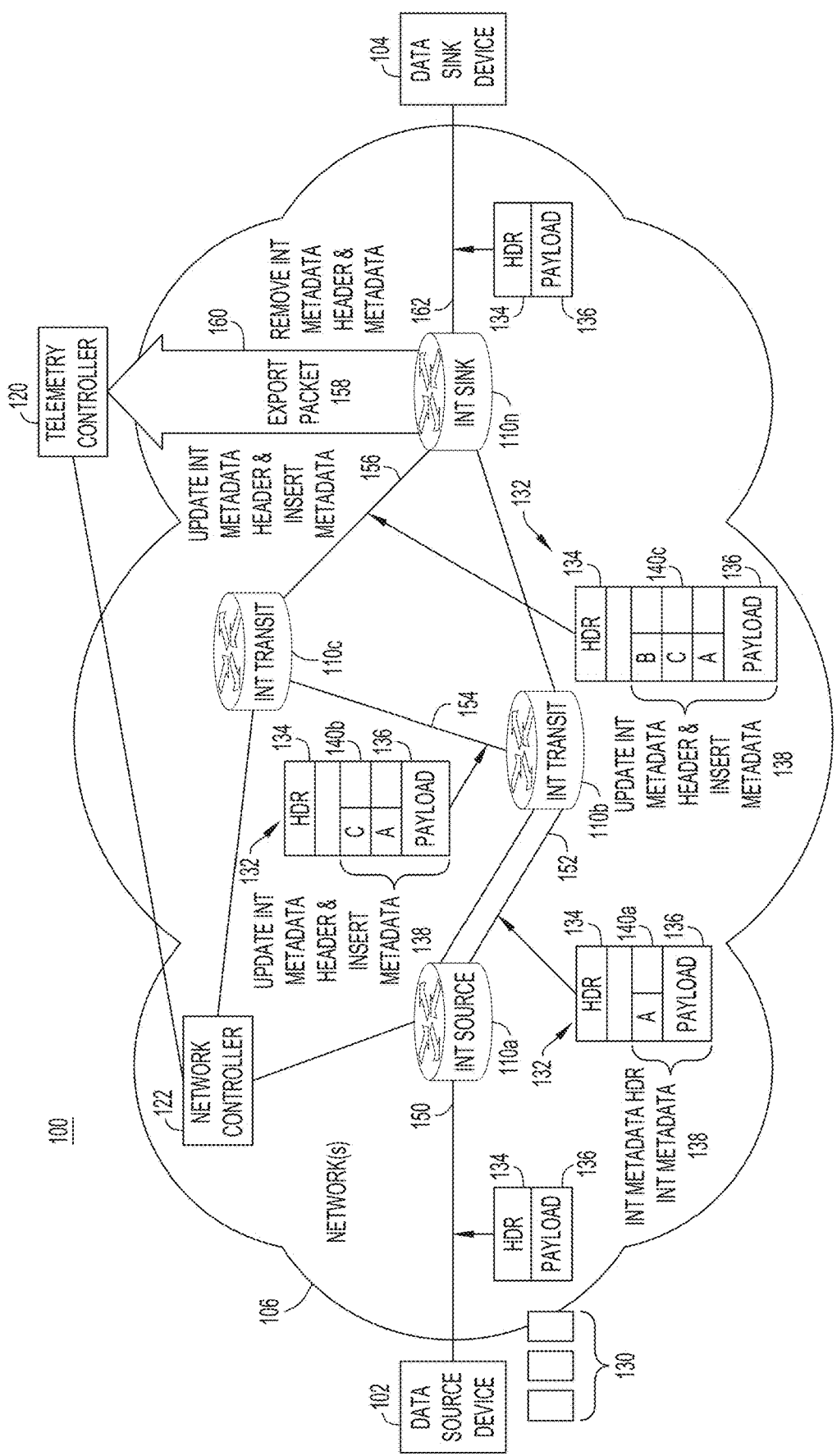
FIG. 1A is a block diagram illustrating a system in which amount of redundant telemetry data traversing in a network is reduced, according to an example embodiment.

A mechanism is presented herein to reduce amount of telemetry data traversing the network. Specifically, the mechanism reduces an overall size of a telemetry packet by avoiding redundant metadata in network packets of the same network flow, obtained as part of in-band network telemetry data collection.

In one form, a first network device obtains a packet of a traffic flow. The packet has a header and a payload. The first network device adds, to the header of the packet, telemetry node level metadata while skipping at least one element of the telemetry node level metadata that is redundant to telemetry node level information of the traffic flow. The first network device also provides the packet to a second network device in a path of a network.

In other form, a network device obtains an export packet that includes a respective node level metadata set obtained from a plurality of network nodes along a path in a network traversed by a packet of a traffic flow. The network device determines one or more elements included in the respective node level metadata set based on a first instruction in the export packet that indicates one or more metadata elements that are being collected by the plurality of network nodes and a second instruction that indicates one or more skipped elements of the one or more metadata elements being collected. The one or more skipped elements are excluded from the respective node level metadata set. The network device also extracts, from the export packet, the one or more elements determined to be included in the respective node level metadata set.

EXAMPLE EMBODIMENTS

Tracking performance and troubleshooting often involves tracing performance along a path in one or more networks. For example, the aforementioned IOAM or INT standards use space in a packet to collect various telemetry data or information at each hop the packet travels in the network(s). That is, telemetry data, sometimes called "collection data" or "measurement data", are values obtained from monitoring i.e., monitoring by network devices performance of a network. The telemetry data includes various information such as identifiers, timestamps, interfaces visited, queue depth, etc., for each network device the packet traverses along the path. A network sink device (last network node along the path in the network such as INT-Sink device or decapsulating node) extracts the gathered telemetry data (in a form of metadata) from the received network packet and generates an export packet that includes the gathered metadata. The generated export packet is transmitted to a telemetry collector for analyzing the metadata to determine performance related issues and/or to perform troubleshooting. Based on analyzing the metadata, one or more network devices may be reconfigured e.g., to gather additional telemetry data, to change a network device setting, etc.

In-band network data collection standards, such as INT and IOAM, do not have a mechanism to check what is being collected and as such, collect redundant telemetry data. Redundant telemetry data means that the same information is collected for the current packet that was already collected in a previous packet of the same traffic flow.

In one or more example embodiments, techniques are provided to reduce amount of telemetry data traversing the network and to reduce the overall size of telemetry packets, by avoiding redundant metadata being added to subsequent network packets of the same flow.

The techniques involve generating and adding an optimization field to the metadata e.g., using an unused bit of the INT metadata or IOAM metadata, to signal or indicate whether to skip redundant elements of a telemetry node level metadata from being added to a header of a packet in the traffic flow. Based on the signaled optimization field, a respective network device, analyzes the telemetry data collected at the respective network device (telemetry node level metadata) and skips redundant elements (already collected elements) of the telemetry node level metadata. Specifically, the respective network device maintains a flow data with telemetry information of the traffic flow and compares elements of the collected telemetry node level metadata with the telemetry information in the flow data. If the elements (their values) are the same, the elements may be skipped, omitted, and not added to the header of the packet. On the other hand, if the elements (their values) are different, the elements are added to the header of the packet and the flow data is updated with new values for the elements. Additionally, an instructional mask is added to a node-level metadata stack that indicates the omitted redundant elements. Therefore, a telemetry collector or a device receiving an export packet determines the omitted elements in the telemetry node level metadata stack.

The techniques reduce the overall size of the packets, help minimize hitting maximum transmission unit (MTU) related issues along the path in a network, reduce network load and congestion, and/or reduce processing time at the telemetry collector. Accordingly, performance monitoring and/or troubleshooting are timely and needed reconfiguration of the network device(s) is expedited without processing delay associated with a large amount of telemetry data.

FIG. 1A is a block diagram illustrating a system 100 in which amount of redundant telemetry data traversing in a network is reduced, according to an example embodiment.

In FIG. 1A, the system 100 includes a data source device 102, a data sink device 104, a plurality of network devices 110*a-n* that transport packet flows from the data source device 102 to the data sink device 104 across one or more network(s) 106, a telemetry collector 120, and a network controller 122. This is only an example of the system 100, and the number and types of entities may vary based on a particular deployment and use case scenario, such as the type of service being provided and network structures of various network(s) 106.

In various example embodiments, the entities of the system 100 (the data source device 102, the data sink device 104, the plurality of network devices 110*a-n*, the telemetry collector 120, and the network controller 122) may each include a network interface, at least one processor, and a memory. Each entity may be any programmable electronic device capable of executing computer readable program instructions. The network interface may include one or more network interface cards (having one or more ports) that enable components of the entity to send and receive data over the network(s) 106. Each entity may include internal and external hardware components such as those depicted and described in further detail in FIG. 8. In one example, at least some of these entities may be embodied as virtual devices with functionality distributed over a number of hardware devices such as virtual switches, routers, etc.

The data source device 102 and the data sink device 104 may be a computer or client device or an endpoint that generates data based on input from an operator or may be a service running on a server that responds to requests or performs actions based on the requests.

The plurality of network devices 110*a-n* are transport nodes that include a network source device 110*a* (e.g., an INT source), first and second intermediate network devices 110*b* and 110*c* (transit nodes), and a network sink device 110*n* (e.g., an INT sink). The network devices 110*a-n* may include, but are not limited to switches, virtual routers, leaf nodes, spine nodes, etc. The network devices 110*a-n* include a central processing unit (CPU), a memory, a packet processing logic, an ingress interface, an egress interface, one or more buffers for storing various packets of various traffic flows, and one or more interface queues such as those depicted and described below. The notation "a-n", "a-m", "a-k", "a-j", "a-h", "a-g", "a-p", and "a-q", and the like denote that a number is not limited, can vary widely, and depend on a particular use case scenario.

The telemetry collector 120 may be a network analysis entity or a software application that stores and analyzes telemetry data to assess network performance or to perform a troubleshooting task. The telemetry collector 120 may simply process and store the telemetry data for analysis by a different device. For example, the telemetry collector 120 may provide the telemetry data to the network controller 122. The network controller 122 may then analyze the telemetry data and configure one or more of the network devices 110*a-n* in the network(s) 106 based on this analysis. In one example embodiment, the telemetry collector 120 and the network controller 122 are integrated into a single device that analyzes the metadata and controls the network devices 110*a-n* based on the analyzed metadata and rules or policies for the network(s) 106.

A traffic flow 130 includes a plurality of packets. A packet 132 includes a header (Hdr) 134 and a payload 136 that carries data such as commands, instructions, responses, information, etc. As the packet 132 traverses along the path through the network(s) 106, telemetry data is added as aggregated metadata (metadata) 138 to the header 134. The telemetry data collected along the path may include one or more of: (1) network device related information such as switch level information (switch identifier), (2) ingress related information such as ingress interface identifier and/or ingress timestamp(s), (3) egress related information such as egress interface identifier, egress timestamp(s), hop latency, egress port transmission link utilization, (4) buffer related information such as queue occupancy level as experienced by the network packet 132, running average occupancy level, etc. In the system 100, the aggregated metadata 138 may be collected as follows.

At 150, the data source device 102 generates the traffic flow 130. Each packet 132 of the traffic flow 130 is transmitted to the network(s) 106 and is received by the network source device 110*a*. Each packet 132 includes the header 134 with a destination address or identifier, instructions for collecting telemetry data, etc. and the payload 136 carrying data intended for the data sink device 104 (destination).

The network source device 110*a* analyzes the header 134 of the packet 132 to determine the next hop, types of telemetry data to collect, and whether an optimization field is set that requires the network source device 110*a* to check for redundancy in the collected telemetry metadata. That is, if the optimization field is set, the network source device 110*a* determines whether one or more elements in its collected telemetry metadata set are the same as telemetry node level information for the traffic flow 130. If the values for these one or more elements are the same as the values of these elements in the telemetry node level information, these elements are redundant i.e., remain unchanged from the previous packet of the traffic flow 130. The network source device 110*a* then adds or inserts its telemetry data set (A) shown at reference numeral 140*a* to the aggregated metadata 138 based on the instructions obtained from the header 134. That is, since the optimization field is set, the network source device 110a skips adding redundant elements of telemetry metadata and indicates that these elements are skipped in its telemetry metadata set (A).

In one example, the instructions for collecting the telemetry data are written into the header 134, by the network source device 110a, prior to the packet 132 being send to the first intermediate network device 110b.

At 152, the network source device 110a transmits or sends the packet 132 to the next hop such as the first intermediate network device 110b. The first intermediate network device 110b similarly analyzes the header 134 of the packet 132 to determine the next hop, which telemetry data to collect, and whether the optimization field is set that requires the first intermediate network device 110b to check for redundancy in the collected telemetry metadata. The first intermediate network device 110b adds or inserts its respective telemetry data set (C) shown at reference numeral 140b to the aggregated metadata 138. Since the optimization field is set, the first intermediate network device 110b skips adding the redundant elements and indicates that they are in skipped in its telemetry metadata set (C).

At 154, the first intermediate network device 110b transmits the packet 132 to the next hop such as the second intermediate network device 110c. The second intermediate network device 110c also examines the header 134 of the packet 132 to determine the next hop, telemetry data to collect, and whether the optimization field is set that requires a check for redundancy in the collected telemetry metadata. The second intermediate network device 110c also adds its respective telemetry data set (B) shown at reference numeral 140c, to the aggregated metadata 138, skipping the redundant elements when the optimization field is set.

At 156, the second intermediate network device 110c transmits the packet 132 to the network sink device 110n. At this point, the aggregated metadata 138 includes a plurality of telemetry node level metadata sets. That is, each telemetry node level metadata set is collected by a respective network node along a path in the network(s) 106 traversed by the packet 132 of the traffic flow 130. The telemetry node level metadata sets may include the last/most recently collected telemetry data set (B) 140c, second telemetry data set (C) 140b, and the first collected telemetry data set (A) 140a. The telemetry node level metadata sets 140a, 140b, and 140c each include a plurality of telemetry elements collected by a respective network node. Since the optimization field is set, the telemetry node level metadata sets 140a, 140b, and 140c may vary in size because redundant elements are omitted. The telemetry node level metadata sets 140a, 140b, and 140c may include different telemetry elements because element redundancy is node specific. As such, the telemetry node level metadata sets 140a, 140b, and 140c include a mask that indicates which redundant elements are omitted and not added to the respective metadata set.

The network sink device 110n generates an export packet 158 with the telemetry node level metadata sets 140a, 140b, and 140c. At 160, the network sink device 110n transmits the export packet 158 to the telemetry collector 120. The aggregated metadata 138 is removed from the packet 132 and the packet 132 is transmitted to the data sink device 104, at 162.

The telemetry collector 120 examines the export packet 158 to determine if it is the first packet of the traffic flow 130. For the first export packet of any traffic flow, the telemetry collector 120 generates a flow data or a flow record for that flow. Specifically, the telemetry collector 120 checks for an existing flow data (flow record) of the traffic flow 130. If it is the first export packet for the traffic flow 130, no optimization is performed. The telemetry collector 120 generates the flow record for the traffic flow 130. The flow record includes all telemetry elements that are being collected by the network devices 110a-n. For the subsequent export packets of the traffic flow 130, the telemetry collector 120 examines the export packet 158 to determine the type of telemetry data being collected by the network devices 110a-n. For each telemetry node level metadata set in the export packet 158, the telemetry collector 120 determines omitted elements and updates the flow record with values of the included elements (changed values of the telemetry metadata). The included elements are extracted and processed for troubleshooting and/or reconfiguring the respective network device(s) and/or network link(s).

Figure 1B:
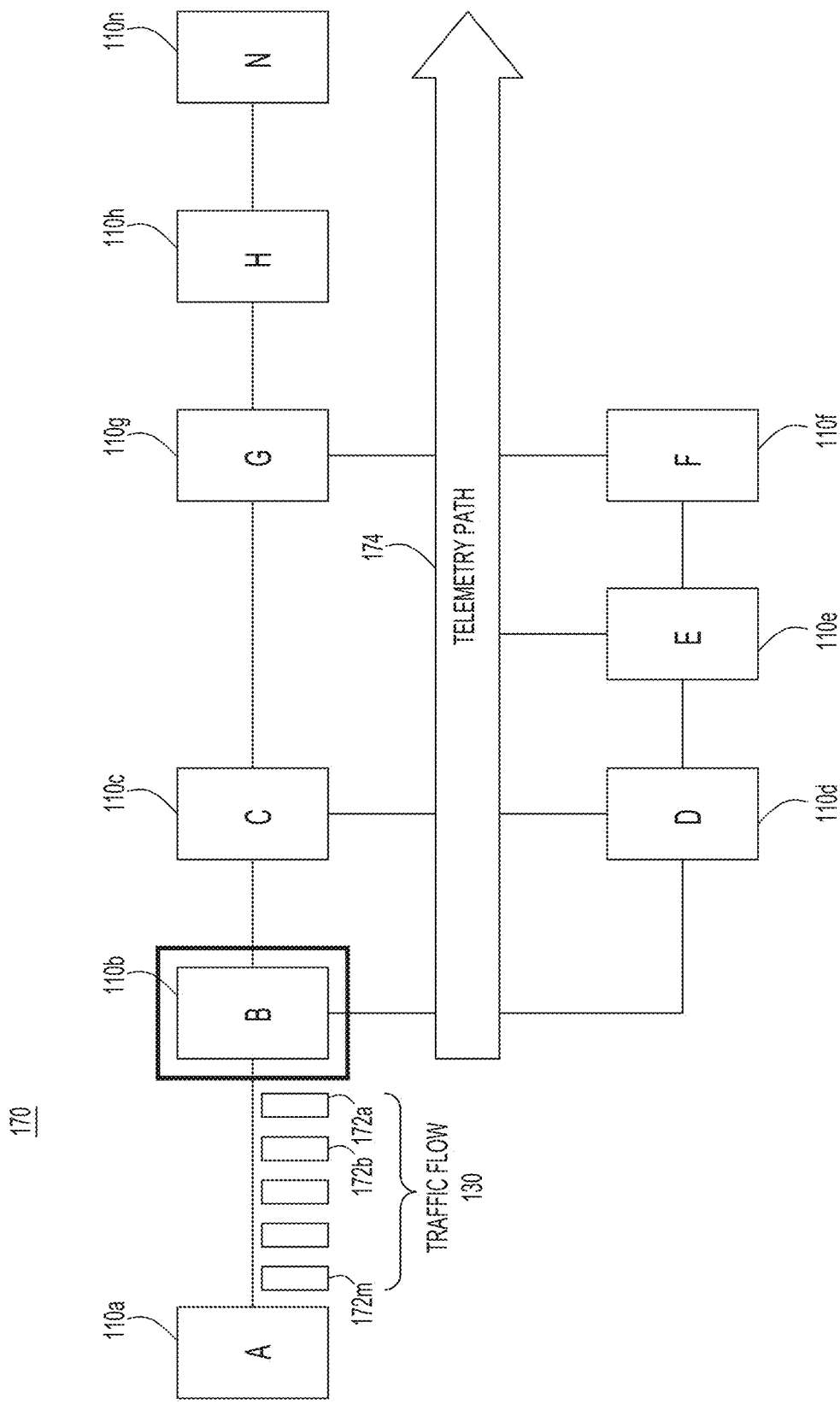
FIG. 1B is a block diagram illustrating another system in which a mechanism is deployed to reduce the amount of redundant telemetry data being transmitted in a network, according to an example embodiment.

With continued reference to FIG. 1A, FIG. 1B is a block diagram illustrating another system 170 in which a mechanism is deployed to reduce amount of redundant telemetry data being transmitted in a network, according to an example embodiment. The system 170 includes the network devices 110a-n.

The network devices 110a-n are configured to collect and add telemetry node level metadata into a plurality of packets 172a-m of the traffic flow 130.

The plurality of packets 172a-m may include a first packet 172a, a second packet 172b, and a last packet (e.g., $10^{th}$ packet) 172m. The plurality of packets 172a-m traverse along a telemetry path 174 that involves the network devices 110a, 110b, 110c, 110g, 110h, and 110n. The network devices 110d, 110e, and 110f are not part of the telemetry path 174. Each of the plurality of packets 172a-m include an instruction bitmap in a header 134 of FIG. 1A, for example. Instruction bitmap instructs the network devices 110a, 110b, 110c, 110g, 110h, and 110n which telemetry data elements to collect. When all defined bits are set to 1 in the instruction bitmap, the network devices 110a-n collect and add all telemetry data elements except for the redundant elements.

In another example embodiment, however, the network controller 122 may directly configure the network devices 110a-n to collect various telemetry data elements and to check for redundant elements. In one or more example embodiments, the network source device 110a may write into a header of a packet in the traffic flow 130, instructions indicating whether to check for redundant elements. The instructions are written, by the network source device 110a, prior to transmitting the packets to one or more transit or intermediate network devices.

When the network(s) 106 are stable (which is common for real-time networks), some of the telemetry elements are the same on all transit, intermediate network devices such as the first intermediate network device 110b, the second intermediate network device 110c, a third intermediate network device 110g, and a fourth intermediate network device 110h. Values of these node level telemetry elements remain the same (do not change) for the subsequent packets 172b-m and should therefore be omitted (not included) in the subsequent packets 172b-m.

For example, when the network(s) 106 are stable and/or there are no network topological changes, the following telemetry elements may be redundant in the subsequent packets 172b-m:
1) Level-1 Ingress/Egress Interface Identifiers (IDs),
2) Level-2 Ingress/Egress Interface Identifiers,
3) Hop Latency,
4) Queue Identifier and Queue Occupancy,
5) Buffer Occupancy, and/or
6) Egress Port Transmission Utilization.

These six example telemetry elements have the same values in the subsequent packets 172b-m for the intermediate network devices 110b, 110c, 110g, and 110h. Specifically, since there are no topological changes in the network(s) 106, Level-1 and Level-2 Ingress/Egress Interface Identifiers remain the same. Additionally, since the conditions in the network(s) 106 are stable, hop latency remains the same. These are but some non-limiting examples of the telemetry elements that may be redundant and other locally collected telemetry data is within the scope of disclosure and may also be redundant in the subsequent packets 172b-m of the traffic flow 130. For example, in some cases, checksum value (error transmission values) may also be the same in the subsequent packets 172b-m in the traffic flow 130.

With continued reference to FIGS. 1A and 1B, FIG. 2 is a diagram illustrating a traffic flow 130 in which redundant elements are identified so as to be omitted from the telemetry node level metadata set in subsequent packets of the traffic flow 130, according to an example embodiment.

The traffic flow 130 includes a first packet 172a and subsequent packets such as a second packet 172b, a third packet 172c, etc., and a last packet 172m. While each of the plurality of packets 172a-m include the header 134 of FIG. 1A with one or more instructions written to the header regarding type of telemetry data to collect and a plurality of telemetry node level metadata sets, FIG. 2 shows an example of one telemetry node level metadata set 200 collected and added by a single network node e.g., the first intermediate network device 110b of FIGS. 1A and 1B. It is understood that similar telemetry node level metadata sets are added to each of the packets 172a-m by other network devices along the telemetry path 174 in the network(s) 106.

The telemetry node level metadata set 200 includes an identifier (ID) of the first intermediate network device 110b, such as a node ID 202 and a plurality of telemetry elements 204a-k. In one example, the node ID 202 is a 32 bits field that identifies the respective network device that collected the telemetry elements 204a-k. The size of the telemetry elements 204a-k may vary and some of these elements may be skipped from the subsequent packets 172b-m of the traffic flow 130.

In this example, the plurality of telemetry elements 204a-k include the following elements. A first telemetry element 204a is a level 1 interface identifiers such as Level-1: Ingress Intf=Eth1/1; Egress Intf=Eth1/2. A second telemetry element 204b is hop latency such as Hop Latency: Value "hop_lat_1". That is, since the network(s) 106 are stable and the first intermediate network device 110b has a consistent load (no congestion), the hop latency remains the same for the subsequent packets 172b-m. A third telemetry element 204c is a queue identifier and capacity such as Queue-id and Queue Occupancy: Values "Q_id1" and "Q-occ1". Since the network(s) 106 are stable and the first intermediate network device 110b has a consistent load (no congestion in processing and at the egress port), then the queue-id and queue occupancy value remain the same for the subsequent packets 172b-m. A fourth telemetry element 204d is an ingress time stamp and a fifth telemetry element 204e is an egress time stamp. Each time stamp may be a 64-bit value. The time stamps are unique telemetry data that has different values from one packet to the next in the same traffic flow 130. A sixth telemetry element 204f is level 2 interface identifiers such as Ingress Intf=Logical-Eth1/1; Egress Intf=Logical-Eth1/2. A seventh telemetry element 204g is an identifier of an egress port being utilized by the respective network device such as an egress port transmission utilization: Value "EgrPortUtil1". Since the network(s) 106 is stable and the first intermediate network device 110b has a consistent load (no congestion in processing and at the egress port i.e., the same number of traffic flows egress the first intermediate network device 110b at the egress port), then the same egress port is used across the packets 172a-m. An eighth telemetry element 204h is buffer occupancy level such as Buffer Occupancy: Value "Buff-Occ1". Since the network(s) 106 are stable and the first intermediate network device 110b has a consistent load (the number of traffic flows ingressing the first intermediate network device 110b remains the same), the buffer occupancy remains the same for the subsequent packets 172b-m. A last telemetry element 204k is a checksum value (error transmission values to detect any transmission errors in the respective packet). It may be different from one packet to the next in the traffic flow 130 or in some instance, may remain the same.

The first intermediate network device 110b generates a flow record for the traffic flow 130 based on values of the telemetry elements 204a-k in the first packet 172a.

With respect to the subsequent packets 172b-172m, the first intermediate network device 110b identifies that the values of the first telemetry element 204a, the second telemetry element 204b, the third telemetry element 204c, the sixth telemetry element 204f, the seventh telemetry element 204g, and the eighth telemetry element 204h remain the same and thus, should be skipped in the subsequent packets 172b-m, shown at 210-1 and 210-2. The redundant telemetry elements at 210-1 and 210-2 are skipped from the telemetry node level metadata set 200 in the subsequent packets 172b-m of the traffic flow 130. These redundant elements at 210-1 and 210-2 are just some non-limiting examples.

In one or more example embodiments, some of the telemetry elements 204a-k are more likely to be redundant and remain redundant in the subsequent packets 172b-m than other telemetry elements. For example, the telemetry elements 204a-k (e.g., INT fields) might be the same across different sets of packets, given that the network(s) 106 are stable and the first intermediate network device 110b is not congested. However, the second telemetry element 204b (Hop-Latency), the third telemetry element 204c (Queue ID and Occupancy), and the eighth telemetry element 204h (Buffer-Occupancy) have a low probability of being the same for different sets of packets for the same traffic flow 130. On the other hand, the first telemetry element 204a (Level-1 Ingress & Egress Intf), the sixth telemetry element 204f (Level-2 Ingress & Egress Intf), and the seventh telemetry element 204g (Egress Port Utilization) have a high probability of being the same for different sets of packets for the same traffic flow 130. That is, network topological changes occur rarely and these metadata values (telemetry elements) have a higher probability of being the same across various packets of the same traffic flow 130. Network conditions and node processing loads may change more frequently and metadata values (telemetry elements) reflective of these conditions may vary from one packet to another packet of the same traffic flow 130.

In the traffic flow 130, since the redundant elements at 210-1 and 210-2 are skipped from the subsequent packets 172b-m, the packet size is reduced. For example, the second packet 172b is reduced by 28 bytes (4+4+4+8+4+4 of skipped redundant telemetry metadata at 210-1 and 210-2). Considering that redundant metadata is omitted from the remaining subsequent packets 172c-m (provided the conditions remain the same) and by other network devices, a final export packet can be significantly reduced in size and significant portion of the network bandwidth can be saved.

Figure 3A:
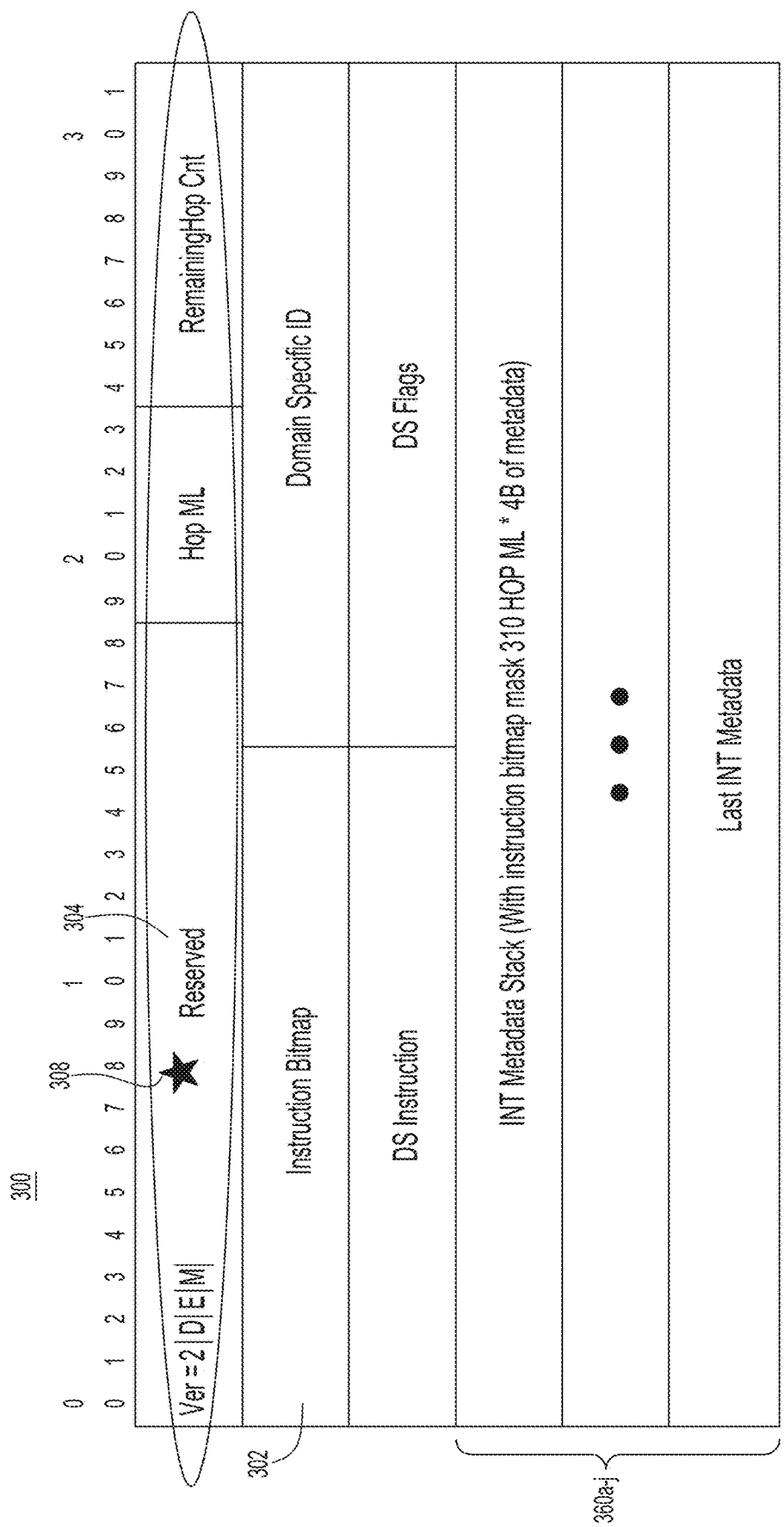
FIGS. 3A and 3B are diagrams illustrating instructions stored in a header of a packet for indicating whether to check for redundant elements in the telemetry node level metadata, according to example embodiments.
Figure 3B:
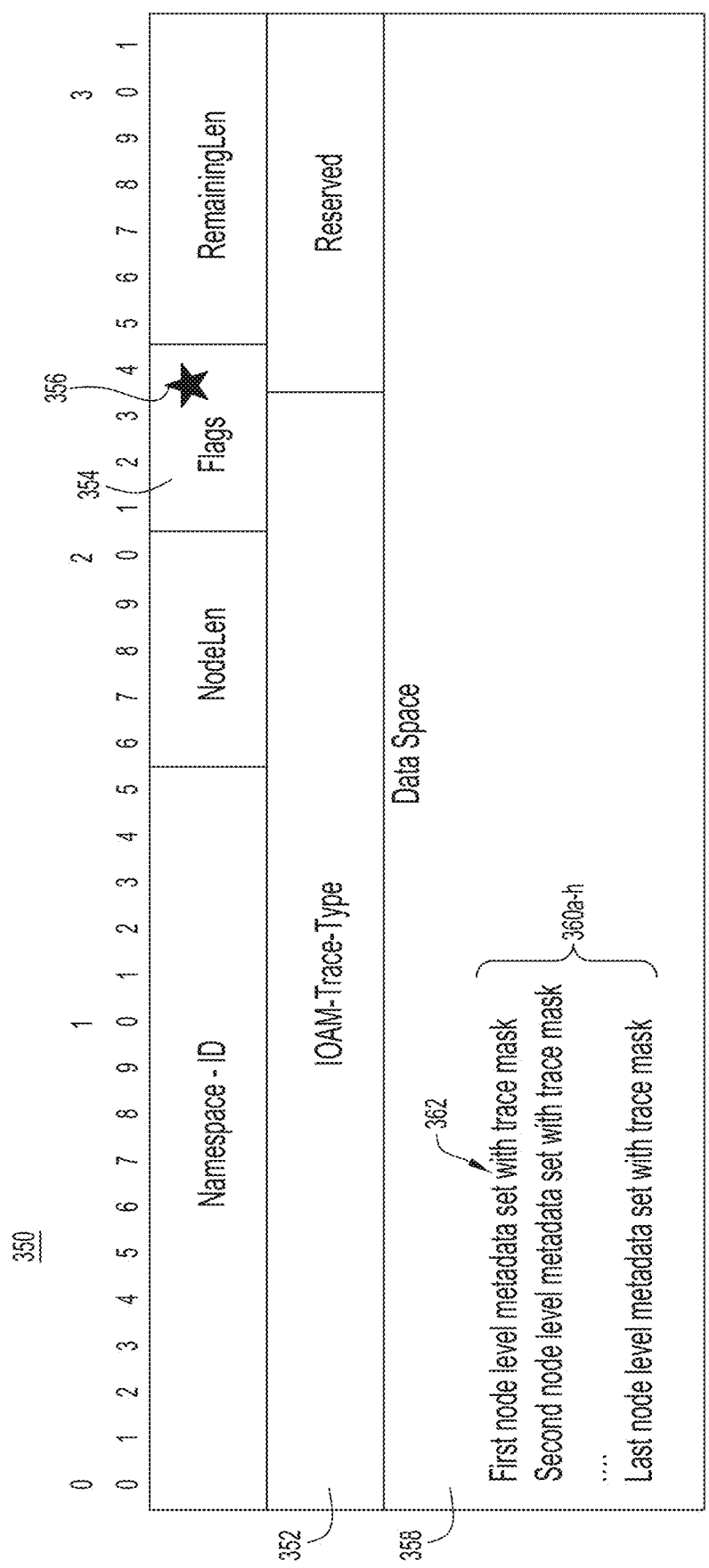

FIGS. 3A and 3B are diagrams illustrating instructions stored in a header 300 or 350, respectively, of a packet for indicating whether to check for redundant elements in the telemetry node level metadata, according to example embodiments. The network source device 110a of FIGS. 1A and 1B is configured to encapsulate an incoming packet and insert the header 300 or 350 (metadata header) that includes various fields. The network source device 110a writes instructions to the header 300 or 350 indicating whether to check for redundant telemetry elements by the respective network devices 110b-n along the telemetry path 174 of FIG. 1B.

Specifically, the header 300 shown in FIG. 3A is an INT metadata header that includes an instruction bitmap 302, a reserved bits space 304, and a plurality of metadata stacks 306a-j (node level metadata sets). In one example, the instruction bitmap 302 is 16-bits long and directs each network device what metadata or telemetry data to collect, such as egress and ingress related information (timestamps), congestion related values (capacity) in a storage buffer, etc. For this purpose, Bits 0, 1, 2, 3, 4, 5, 6, 7, 8 and 15 of the instruction bitmap 302 are used and set to 1.

The reserved bits space 304 includes various identifiers and flags such as D-bit, M-bit etc. An unused bit such as one bit from the most significant bit (MSB) of the reserved bits space 304, is allocated for an optimization flag or field 308. When the optimization field 308 is set to 1, each network device along the telemetry path 174 of FIG. 1B checks for presence of redundant metadata and skips from adding the redundant metadata to its respective node level metadata stack.

The plurality of metadata stacks 306a-j includes a first node level metadata set, additional node level metadata sets (each of which corresponds to a respective intermediate network device), and a last node level metadata set. Each node level metadata set includes an instruction in a form of an instruction bitmap mask 310 that indicates one or more of telemetry elements that were skipped from the respective node level metadata set. That is, each hop or each network device along the telemetry path 174 of FIG. 1B inserts the instruction bitmap mask 310, a respective metadata length (hop ML), and the respective node level metadata set (4 bytes or less of metadata).

The header 350 shown in FIG. 3B is an IOAM metadata header that includes an IOAM-Trace-type 352. In one example, the IOAM-Trace-type 352 is 24-bit long and directs each network device as to what metadata to collect, which may be written to the header of the packet by the source network device prior to providing it to the intermediate network devices. For this purpose, Bits 0, 1, 2, 3, 4, 5, 6, 7, 8, 9, 10, 11, 22, and 23 of the IOAM-Trace-type 352 are used. The header 350 further includes a flag space 354. The flag space 354 includes a plurality of flags such as an optimization field 356 that indicates whether to check the telemetry node level metadata for redundant elements. When the optimization field 356 is set to 1, this indicates to a respective network device along the telemetry path 174 of the network(s) 106 that the telemetry node level metadata needs to be checked for redundancies and that the redundant elements are to be skipped.

The header 350 further includes a data space 358 that carries a plurality of node level metadata sets 360a-h. The plurality of node level metadata sets 360a-h include a first node level metadata set, a second node level metadata set, etc., and a last node level metadata set. Each has a respective IOAM trace mask (trace mask) 362 added thereto. The respective trace mask 362 is an instructional mask that indicates which telemetry elements are redundant and skipped from the respective node level metadata set and which elements are included in the respective node level metadata set. The instructional mask includes the same number of bits as the IOAM-Trace-type 352 and each bit is set to 0 (when the telemetry element is included) or to 1 (when the telemetry element is omitted/skipped). The trace mask 362 is defined differently from the instruction bitmap mask 310 of FIG. 3A, based on their respective standards.

The instructional mask is a newly added measurement node metadata that may be 32 bits long and corresponds to instructions indicating which telemetry node level metadata elements to collect. When the optimization field is set, each of the network devices 110a-n adds this instructional mask as the first node metadata in the respective node level metadata set and only then, it is followed by the remaining telemetry metadata. Each of the 32-bits of the instructional mask indicates, which metadata is redundant from the previous packet in the same traffic flow.

This 32-bit mask may be defined in various ways according to various example embodiments. For example, for the INT standard, out of 32-bits only 16 MSB bits are used for INT and the rest is reserved. The bits may be defined for the INT standard as follows using the example of the traffic flow 130 of FIG. 2:

bit0 (MSB): Not used, as Switch-id always needs to be added.
bit1: Level 1 Ingress Interface ID (16 bits)+Egress Interface ID (16 bits) is redundant.
bit2: Hop latency is redundant.
bit3: Queue ID (8 bits)+Queue occupancy (24 bits) is redundant.
bit4: Not used, as Ingress timestamp cannot be redundant.
bit5: Not used, as Egress timestamp cannot be redundant.
bit6: Level 2 Ingress Interface ID (32 bits)+Egress Interface ID (32 bits) is redundant.
bit7: Egress port TX utilization is redundant.
bit8: Buffer ID (8 bits)+Buffer Occupancy (24 bits) is redundant.
bit15: Checksum Complement is redundant.

Every time one of the network devices 110a-n receives a packet with the optimization field set to 1 in the header, it performs the following operations to skip from adding the redundant elements to the node level metadata set.

Based on the instructional bitmap, for each instruction (except bit-0: switch-id which needs to be added), the intermediate network device checks its flow table for the traffic flow and compares the current value of the telemetry element with the value stored in the Flow Table for this telemetry element. If the values match, then the intermediate network device skips adding that telemetry element to the packet and sets the corresponding bit in the instructional mask to 1, for example, to signal that it is redundant and is being skipped. As such, the intermediate network device adds only those telemetry elements whose current values are different than previous values stored in the Flow Table.

The intermediate network device then adds the generated instructional mask to the top of the node level metadata set.

Figure 4:
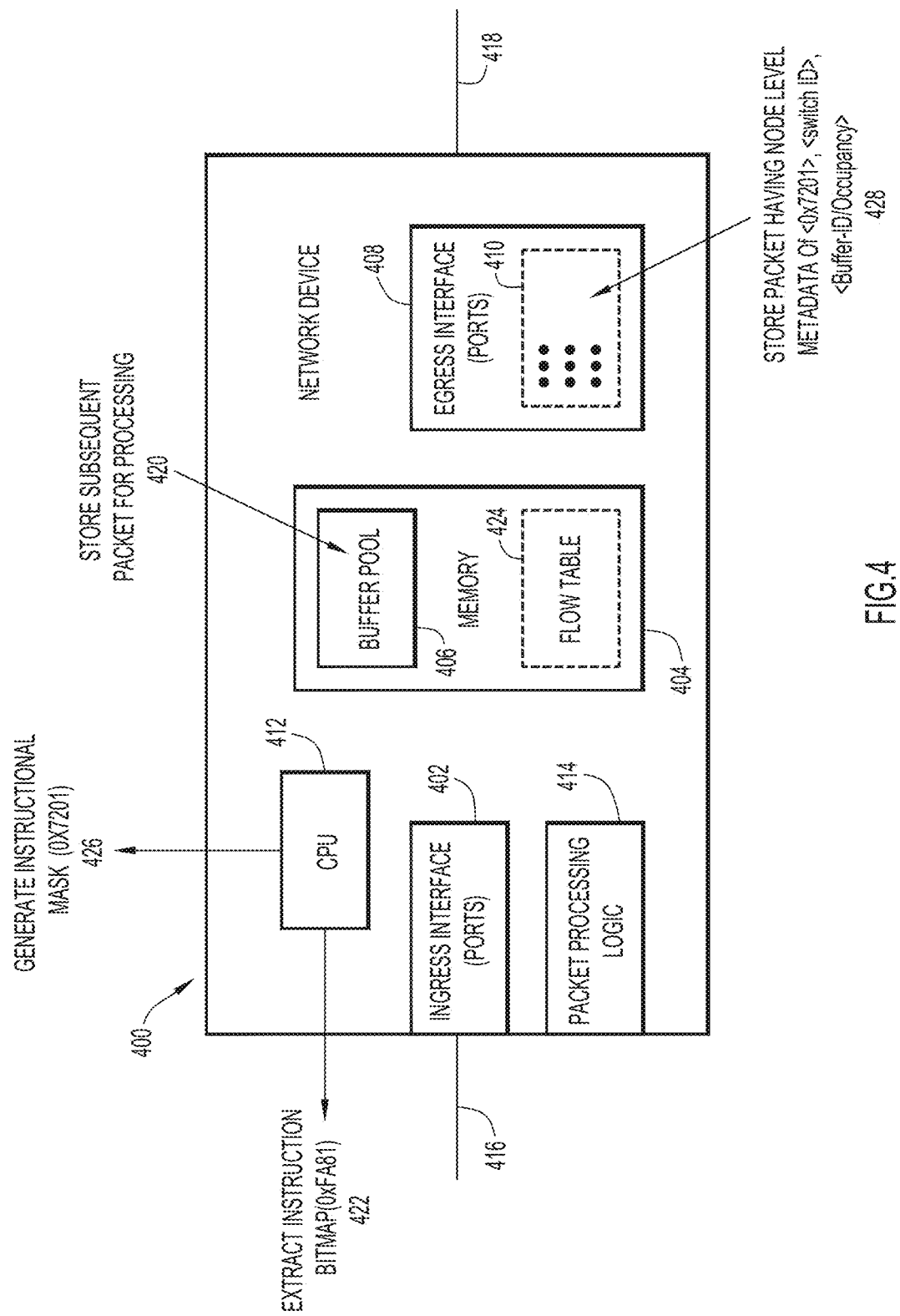
FIG. 4 is a diagram illustrating a network device generating a subsequent packet in a traffic flow in which redundant telemetry elements are skipped based on flow data, according to an example embodiment.

FIG. 4 is a diagram illustrating a network device 400 generating a subsequent packet in a traffic flow in which redundant telemetry elements are skipped based on flow data, according to an example embodiment. One example of the network device 400 is the intermediate network device 110b of FIGS. 1A and 1B.

The network device 400 includes an ingress interface 402, a hardware memory 404 that includes a buffer pool 406 and flow table 424, and an egress interface 408 with an interface queue 410, a CPU 412, and a packet processing logic 414.

The ingress interface 402 (one or more ports) is configured to receive packets of various traffic flows and place them in the buffer pool 406 for processing. The buffer pool 406 may include one or more buffers (in the memory 404) that store the packets while various lookup operations and processing are performed at the network device 400. When the processing is completed, the packets are placed in the interface queue 410 associated with the egress interface 408. The egress interface 408 (one or more ports) is configured to transmit the packets to their next hop or the destination. The ingress interface 402 and the egress interface 408 are ports at which the network device 400 receives packets from the network and sends packets into the network.

The memory 404 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 404 may comprise one or more tangible (non-transitory) computer readable storage media (e.g., a memory device) encoded with software comprising computer executable instructions and when the software is executed (by the CPU 412) it is operable to perform certain network device operations described herein. That is, the memory 404 stores various instructions that are to be performed by the CPU 412.

The CPU 412 executes instructions associated with software stored in memory 404. Specifically, the memory 404 stores instructions for control logic that, when executed by the CPU 412, causes the CPU 412 to perform various operations on behalf of the network device 400 as described herein. The memory 404 may also store configuration information received from the network controller 122 to configure the network device 400 according to desired network functions. It should be noted that in some example embodiments, the control logic may be implemented in the form of firmware implemented by one or more ASICs. In some example embodiments, the CPU 412 may be a microprocessor or a microcontroller.

The packet processing logic 414 is representative of packet processing components in the network device 400 such as switch tables, switch fabric that operate to determine whether to drop, forward (and via a particular egress port), switch, etc. a particular packet based on contents in the header of the packet. The packet processing logic 414 may be implemented by one or more Application Specific Integrated Circuits (ASICs), etc.

The network device 400 obtains from a network link 416 via the ingress interface 402, a first network packet of a traffic flow. Since this is the first packet of the traffic flow, the instruction bitmap is analyzed to determine telemetry elements to collect, a flow table is generated based on the collected telemetry elements and the collected telemetry elements are added to the node level metadata set. Since this is the first network packet of a traffic flow and all of the collected telemetry elements are to be included (no redundant values), the instructional mask (instruction bit-map masks or IOAM-trace-mask) is 0 indicating that all metadata elements are included in the node level metadata set.

When a subsequent packet of a traffic flow is received via the ingress interface 402. At 420, the subsequent packet is stored in the buffer pool 406 for processing. At 422, the CPU 412 (optionally, the packet processing logic 414) extracts an instruction bitmap from the packet such as 0xFA81 (1111 1010 10000001). The CPU 412 then performs the following operations based on the instruction bitmap.

The CPU 412 adds an identifier of the network device 400 such as a switch ID. Next, the first bit of the instruction bitmap is set to 1, which is an instruction to add Level-1 Ingress and Egress Interface identifiers. The CPU 412 compare the current value (identifiers of the Level-1 Ingress and Egress) with values stored in a flow table 424 for the traffic flow. The flow table 424 is stored in the memory 404 and includes values of the telemetry elements of the node level metadata set obtained from previous packets of the traffic flow. The flow table 424 is a snapshot of last node level metadata set. The flow table 424 is maintained for each traffic flow being monitored by the network device 400.

Based on the flow table 424, the CPU 412 generates the instructional mask such as an instruction-bitmap mask, at 426. Specifically, if the bit-1 values are same, the CPU 412 sets the Instruction-bitmap-mask to 0x4000 (0100 0000 0000 0000). The CPU 412 then moves to the next instruction bit-2, which is Hop Latency, compares the current hop latency with the value in the flow table 424, and if the values are same, the Instruction-bitmap-mask is set to 0x6000 (0110 0000 0000 0000). Next, the CPU 412 processes the next instruction bit-3, which is Queue-ID/Occupancy, and compares the current Queue-ID/Occupancy with the values in the flow table 424. If the values are same, the CPU 412 sets the Instruction-bitmap-mask to 0x7000 (0111 0000 0000 0000).

The CPU 412 then continues to process the next instruction bit-4, which is Ingress Timestamp. Since timestamps are different from the ones in the previous packet of the same traffic flow, the timestamp is added to the node level metadata set. The CPU 412 then does not set Instruction-bitmap-mask for bit-4 and the Instruction-bitmap-mask remains 0x7000. With respect to the next instruction bit-5, which is an Egress timestamp, the timestamp is also added to the node level metadata set and the Instruction-bitmap-mask remains 0x7000.

The next instruction bit-6 is Level-2 Ingress and Egress Interface identifiers. The CPU 412 compares the current Level-2 Ingress and Egress Interface identifiers with values in the flow table 424. If the values are same, the CPU 412 sets the Instruction-bitmap-mask to 0x7200 (0111 0010 0000 0000). The next instruction bit-8 is a Buffer identifier and occupancy. The CPU 412 compares the current Buffer identifier and occupancy with values in the flow table 424. If the values are different, the CPU 412 does not set Instruction-bitmap-mask and the Instruction-bitmap mask remains to be 0x7200 for the corresponding bit. The CPU 412 also adds the Buffer identifier and occupancy to the node level metadata set. Next, the CPU 412 moves to the next instruction bit-15, which is the Checksum Complement, and compares the Checksum Complement of the current packet with the previous value stored in the flow table 424. If the values are same, the CPU 412 sets the Instruction-bitmap-mask=0x7201 (0111 0010 0000 0001).

Since the CPU 412 traversed each of the instruction bitmap, the final mask or the Instruction-bitmap mask is equal to 0x7201. The CPU 412 adds to the top of the node level metadata set the final mask, which is then followed by the telemetry elements that changed values such as the Switch identifier, the Buffer-identifier, and buffer occupancy. At 428, the CPU 412 then add the packet to the interface queue 410. The packet includes a node level metadata set that has the Instruction-bitmap mask, and the three telemetry elements (Switch identifier, buffer identifier and occupancy).

The packet is then transmitted, by the egress interface 408, via another network link 418, to the next hop or the destination.

Figure 5:
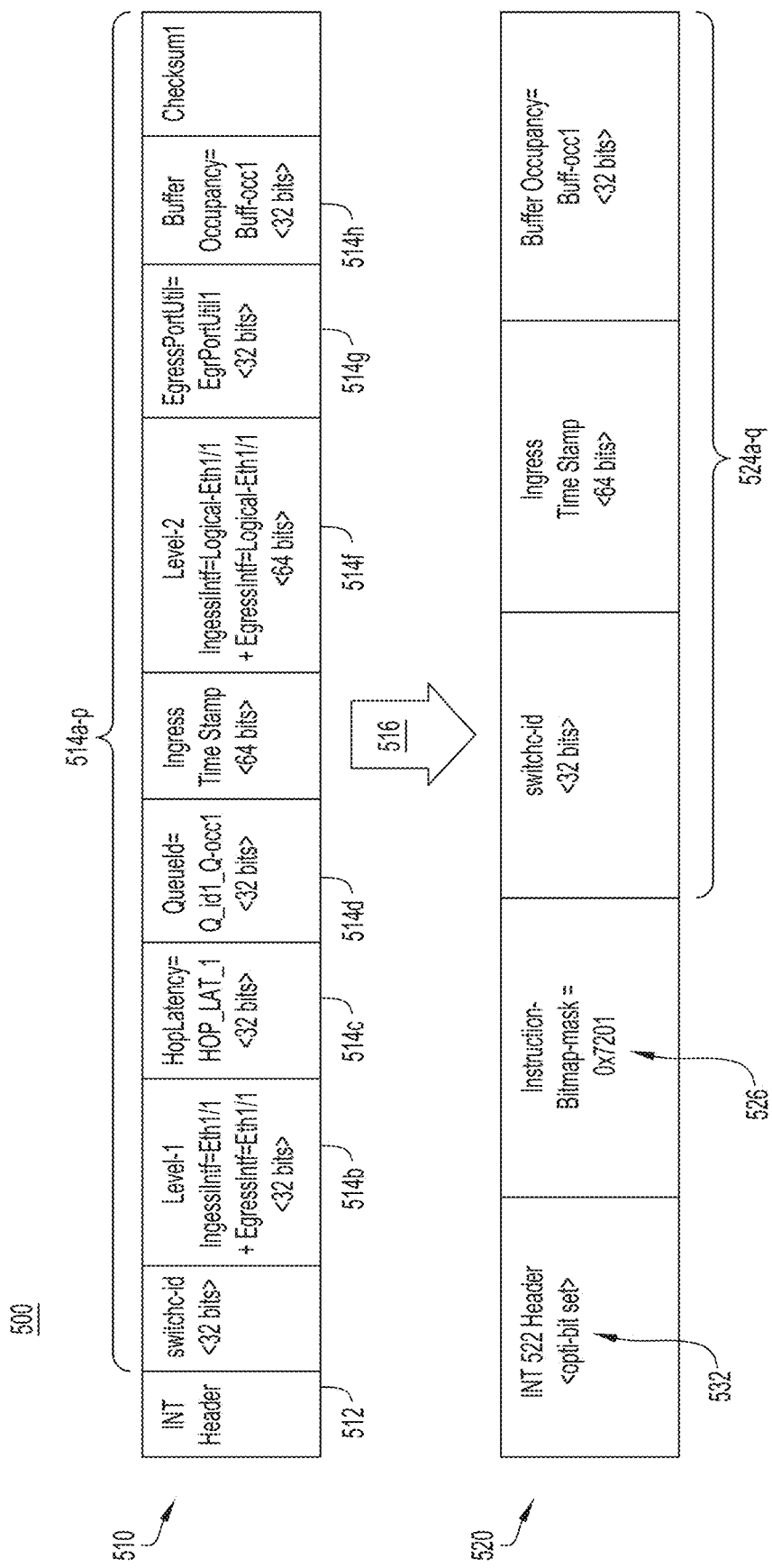
FIG. 5 is a view illustrating a comparison between a first subsequent packet of a traffic flow in which an optimization field is not set and a second subsequent packet of the traffic flow in which an optimization field is set, according to an example embodiment.

With continued reference to FIG. 4, FIG. 5 is a view illustrating a comparison 500 between a first subsequent packet of a traffic flow in which an optimization field is not set and a second subsequent packet of the traffic flow in which the optimization field is set, according to an example embodiment. The first subsequent packet 510 is representative of subsequent packets of the traffic flow in which the optimization field is not set and the second subsequent packet 520 is representative of subsequent packets of the traffic flow in which the optimization field is set.

The first subsequent packet 510 includes a header 512 (e.g., INT header) and telemetry elements 514*a-p* such as <Switch-id>, <Level-1 Ingress/Egress Intf, <HopLatency>, <Queue-ID/Occupancy>, <Ingress Timestamp>, <Level-2 Ingress/Egress Intf, <Buffer-ID/Occupancy>,<Checksum Complement>. Some of the telemetry elements 514*a-p* are the same in the subsequent packets of the traffic flow i.e., the redundant telemetry elements 514*b*, 514*c*, 514*d*, 514*f*, 514*g*, and 514*h*. Since the optimization field is not set, these redundant telemetry elements are included in the node level metadata set of each subsequent packet in the traffic flow.

At 516, when an optimization field 532 is set in a header 522 of the second subsequent packet 520, these redundant telemetry elements are skipped i.e., the redundant telemetry elements 514*b*, 514*c*, 514*d*, 514*f*, 514*g*, and 514*h* and only telemetry elements 524*a-q* are included in the node level metadata set of the second subsequent packet 520. Additionally, an instruction-Bitmap mask 526 is added to the beginning of the node level metadata set. Specifically, the second subsequent packet 520 includes telemetry elements 524*a-q* such as <Instruction-bitmap-mask>, <Switch-id>, <Ingress Timestamp>, <Buffer-ID/Occupancy>.

By comparing the first subsequent packet 510 with the second subsequent packet 520, it is visible that the size of the packet is reduced. The first subsequent packet 510 has the total size of the header 512 at 40 bytes (4+4+4+4+8+8+4+4). On the other hand, the second subsequent packet 520 has the total size of the header 522 reduced to 20 bytes (4+4+8+4). As a result, the intermediate network device avoids adding 20 bytes (40-20) of redundant metadata information. This is per node (node level savings). Once the packet progress to other network devices along the telemetry path, these network devices also add their respective optimized measurement information (respective node level metadata sets). The space saving is aggregated based on the number of intermediate network devices and in terms of bytes per-packet, it becomes even more significant. If millions of traffic flows are being tracked for analysis, this mechanism saves bandwidth, increases the speed with which the export packets reach the telemetry collector 120 of FIG. 1A, and results in a faster response and analysis.

In another example, the network device 400 is an IOAM node configured to generate an IOAM trace mask that may be defined as 24 MSB out of 32-bits used for IOAM and the remaining bits are reserved. The bits in the IOAM trace mask are defined as follows, for example.

Bit 0 (MSB): Not used, as node-id always needs to be added.
Bit 1: Ingress if id and egress if id (short format) is redundant.
Bit 2: Not used, as timestamp cannot be redundant.
Bit 3: Not used, as timestamp cannot be redundant.
Bit 4: Transit delay is redundant.
Bit 5: IOAM-Namespace specific data (short format) is redundant.
Bit 6: Queue depth is redundant.
Bit 7: Checksum Complement is redundant.
Bit 8: Not used.
Bit 9: Ingress if id and egress if id (in wide format) is redundant.
Bit 10: IOAM-Namespace specific data (in wide format) is redundant.
Bit 11: Buffer occupancy is redundant.
Bit 12-23: Not used (reserved).

The IOAM processing of the IOAM-trace-mask is similar to the one explained above for the INT instructional mask of FIG. 4. Every time the network device 400 receives a subsequent packet of the traffic flow with the optimization field being set in the IOAM header, the network device performs the following operations.

Based on the IOAM-Trace-Type bitmap, for each trace-type bit (except bit-0: node-id which is always added), the network device 400 checks the flow table 424 and compares the current value of that trace-type bit with the previous value stored in the flow table 424 for this traffic flow. If the values match, then the network device 400 skips adding the telemetry element to the packet and sets the corresponding bit in the IOAM-trace-mask. As such, the network device 400 adds metadata whose current values have changed (different from the previous values in the flow table 424). The network device 400 updates the flow table 424 with new values and adds the IOAM-trace-mask to the top of the node level metadata set.

The instructional mask (instruction bitmap mask or the IOAM-trace-mask) is used by the telemetry collector 120 of FIG. 1A to process export packets and determine omitted telemetry elements.

Specifically, the telemetry collector 120 generates a flow data or a flow record using a first export packet of any traffic flow. The first packet has all the metadata elements, i.e. no optimization is triggered as of yet. The telemetry collector 120 examines a first instruction (instruction bitmap or IOAM-Trace-Type) in the export packet to determine types of metadata being collected by each of the network devices 110*a-n* along the telemetry path 174 and generates the flow data. The flow data includes a value for each telemetry element of the node level metadata set of the traffic flow.

From the second export packet and onwards of the same traffic flow, the telemetry collector 120 detects optimized export packets i.e., that these export packets only contain the telemetry elements (metadata) which has changed from the previous packet of the same traffic flow. In one example, the telemetry collector 120 processes these optimized export packets as follows.

Since the optimized export packets contain telemetry information collected by various different network devices along the telemetry path 174 in the network(s) 106, the telemetry collector 120 iterates over each node level metadata set and performs the following actions for each node level metadata set.

First, the telemetry collector 120 processes instructional mask values (the instruction bitmap-mask or IOAM-trace-mask on top of the metadata stack (node level metadata set)). The telemetry collector 120 thus determine which telemetry elements are included and which are skipped as redundant based on the instructional mask values. Specifically, the telemetry collector 120 performs an XOR operation between the first instruction that indicates the type of metadata being collected and a second instruction (instructional mask) that indicates the skipped telemetry elements. Based on the XOR operation, the telemetry collector 120 knows the telemetry elements that changed values and updates the flow data accordingly.

For example, when the intermediate network device 110*b* operates according to the INT standard, the telemetry collector 120 performs the XOR operation on the instruction bitmap-mask with the instruction bitmap (carried in the INT header) and thus obtains one or more instruction bits which need to be update in the flow data. The instruction bitmap may be 16 bits long and may include egress related information (timestamps), ingress related information, congestion related values (capacity) in a storage buffer, etc. If the instruction bitmap is set as 0xF281 (1111 0010 1000 0001) and the instruction-bitmap-mask is set as 0x7201 (0111 0010 0000 0001), then XOR operation yields 0x8080 (1000 0000 1000 0000). The XOR operation indicates that the only telemetry elements included in the node level metadata set are Switch-id, the Buffer-ID and occupancy values. The telemetry collector 120 extracts these values from the export packet and updates the flow data.

As another example, when the intermediate network device 110*b* operates according to the IOAM standard, the telemetry collector 120 performs the XOR operation on the IOAM-trace-mask with IOAM-trace-type (carried in IOAM header). By performing the XOR operation, the telemetry collector 120 obtains only those IOAM trace type (telemetry elements) which need to be update in the flow data (the ones that changed their value from the previous export packet in the same traffic flow).

The telemetry collector 120 iterates the above process for next node level metadata set until the export packet is fully processed.

According to the techniques presented above, the overall size of telemetry packets reduces, thereby chances of hitting maximum transmission unit (MTU) related issues along the traversed path in a network are also reduced. The bandwidth required to transport the packets in the flow is reduced and the export packet size is also reduced. In other words, the overall network load is reduced especially if a large number of flows are subject to measurement and metadata collection. Not transmitting redundant information also reduces the processing time by the telemetry collector 120, improving troubleshooting and reconfiguration of network links and/or the network devices 110*a-n*.

Figure 6:
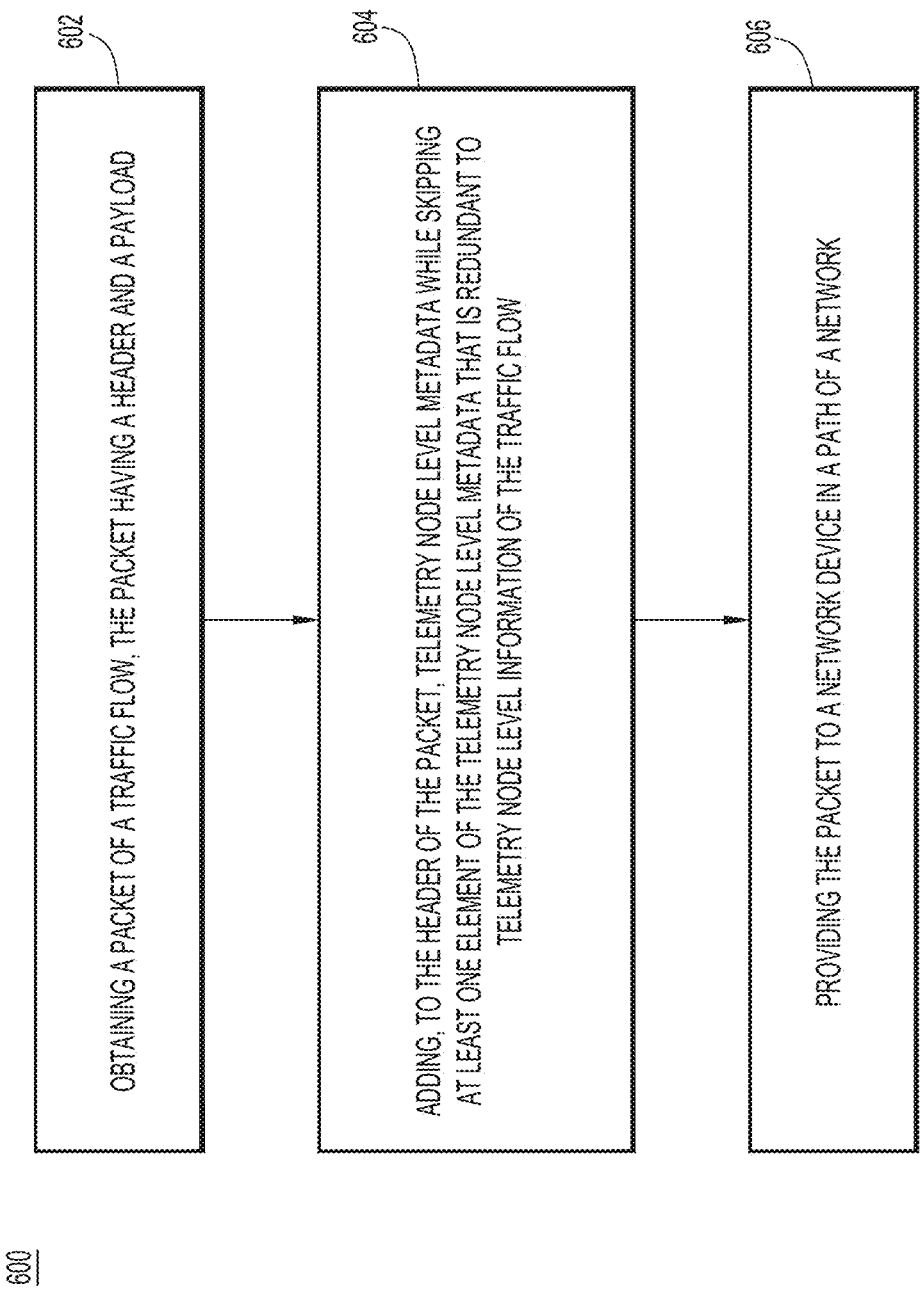
FIG. 6 is a flow diagram illustrating a method of adding telemetry node level metadata while skipping at least one element of the telemetry node level metadata that is redundant, according to an example embodiment.

FIG. 6 is a flowchart illustrating a method of 600 of adding telemetry node level metadata while skipping at least one element of the telemetry node level metadata that is redundant, according to an example embodiment. The method 600 may be performed by any of the network devices 110*a-n* of FIGS. 1A and 1B or the network device 400 of the FIG. 4. For example, the method 600 may be performed by a first intermediate network device 110*b* that processes a packet and provides it to a second intermediate network device 110*c*.

The method 600 involves, at 602, obtaining a packet of a traffic flow. The packet has a header and a payload. The method 600 further involves, at 604, adding to the header of the packet, telemetry node level metadata while skipping at least one element of the telemetry node level metadata that is redundant to telemetry node level information of the traffic flow. The method 600 further includes, at 606, providing the packet to a network device in a path of a network.

In one instance, the method 600 may further involve storing a flow data that includes the telemetry node level information for the traffic flow. The flow data may be generated based on the telemetry node level information obtained from a first packet in the traffic flow. The method 600 may further involve updating the telemetry node level information stored in the flow data based on changes in the telemetry node level metadata of subsequent packets in the traffic flow.

In one or more example embodiments, the method 600 may further involve collecting the telemetry node level metadata that includes a plurality of elements, based on one or more instructions obtained by the first network device from the header of the packet. The one or more instructions may be written to the header of the packet by a source network device prior to the packet being obtained by a network device. The method 600 may further involve determining whether first values of the plurality of elements are different from second values of the telemetry node level information stored in the flow data. The at least one element that has the same value as the telemetry node level information is not added to the header of the packet.

In one instance, the method 600 may further involve comparing one or more first values of the telemetry node level metadata with corresponding one or more second values of the telemetry node level information stored at a network device. The one or more second values of the telemetry node level information may be obtained from one or more previous packets of the traffic flow.

In one form, the operation 604 of adding the telemetry node level metadata may include adding, to the header of the packet, a first element of the telemetry node level metadata having a different value from the telemetry node level information and skipping a second element of the telemetry node level metadata that has the same value as the telemetry node level information.

In one or more example embodiments, the method 600 may further involve generating an instructional mask that indicates that the first element of the telemetry node level metadata is added and that the second element of the telemetry node level metadata is skipped. The method 600 may further involve adding the instructional mask to the header of the packet.

In one instance, the method 600 may involve determining whether to check the telemetry node level metadata for the at least one element that is redundant based on one or more instructions obtained by a network device from the header of the packet. The one or more instructions may be written to the header of the packet by a source network device prior to obtaining the packet by the network device.

In one form, the one or more instructions may be stored in an in-band network telemetry (INT) bitmap in the header of the packet and the INT bitmap may include a field for indicating whether to check the telemetry node level metadata for the at least one element that is redundant.

In another form, the one or more instructions may be stored in an in-situ operation, administration, and maintenance (TOM) trace type option of the header of the packet and the TOM trace type option may include a field for indicating whether to check the telemetry node level metadata for the at least one element that is redundant.

In one or more example embodiments, the telemetry node level metadata may include one or more of one or more first identifiers of an ingress interface of a network device, one or more second identifiers of an egress interface of the network device, one or more hop latency values indicative of a traffic rate in the path in the network, one or more first occupancy values of an egress queue of the network device that is configured to store a plurality of packets that are to be transmitted from the network device on the path in the network, one or more second occupancy values of a buffer of the network device that is configured to store the plurality of packets being processed by the network device, or one or more error transmission values.

In one instance, the method 600 may further involve adding, to the header of the packet, information indicating that the at least one element of the telemetry node level metadata that is redundant to the telemetry node level information of the traffic flow is skipped.

Figure 7:
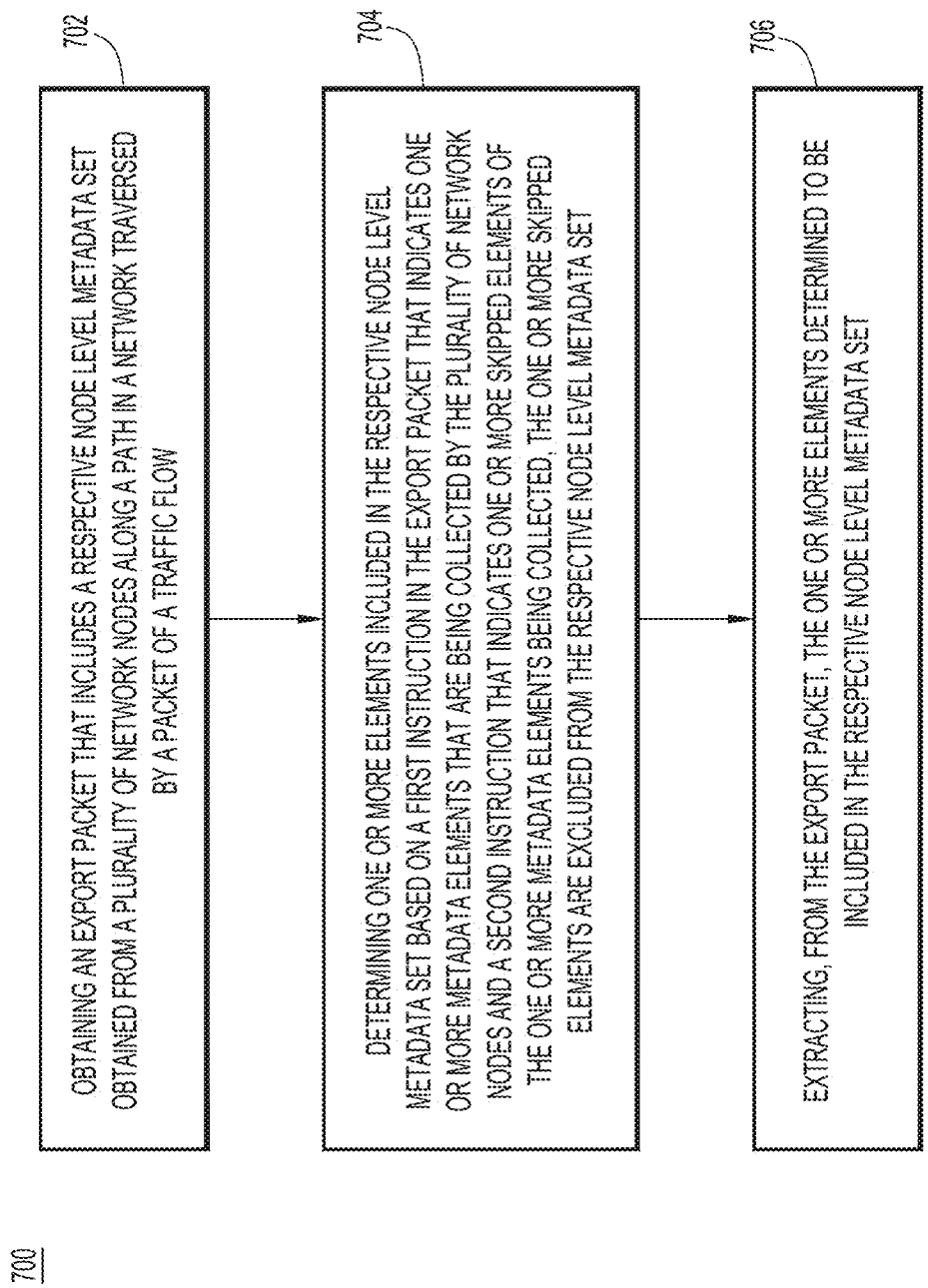
FIG. 7 is a flow diagram illustrating a method of determining telemetry elements included in a node level metadata set of an export packet based on various instructions obtained from the export packet, according to an example embodiment.

FIG. 7 is a flowchart illustrating a method 700 of extracting one or more elements determined to be included in a received export packet, according to an example embodiment. The method 700 is performed by a computing or a network device, such as the telemetry collector 120, shown in FIG. 1A or the network controller 122 of FIG. 1A that is configured to perform the method 700.

The method 700 involves at 702, obtaining an export packet that includes a respective node level metadata set obtained from a plurality of network nodes along a path in a network traversed by a packet of a traffic flow.

The method 700 further involves at 704, determining one or more elements included in the respective node level metadata set based on a first instruction in the export packet that indicates one or more metadata elements that are being collected by the plurality of network nodes and a second instruction that indicates one or more skipped elements of the one or more metadata elements being collected. The one or more skipped elements are excluded from the respective node level metadata set.

At 706, the method 700 further involves extracting, from the export packet, the one or more elements determined to be included in the respective node level metadata set.

In one or more example embodiments, the method 700 may further involve processing the one or more elements extracted from the export packet to generate a configuration instruction for a respective network node of the plurality of network nodes, which generated the respective node level metadata set.

In one form, the operation 704 of determining the one or more elements of the respective node level metadata set may include extracting, from the export packet, the first instruction that indicates the one or more metadata elements collected by each of the plurality of network nodes, extracting, from the respective node level metadata set, the second instruction that indicates the one or more skipped elements that are collected by a respective network node but are omitted from the respective node level metadata set generated by the respective network node, and comparing the first instruction with the second instruction to determine the one or more elements included in the respective node level metadata set.

In one instance, the one or more skipped elements have the same values as in a previous export packet that is obtained based on a previous packet of the traffic flow.

According to one or more exemplary embodiments, the method 700 may further involve obtaining a first export packet that includes the respective node level metadata set obtained from each of the plurality of network nodes along the path in the network traversed by a first packet of the traffic flow. The method 700 may further involve generating, for each of the plurality of network nodes, a flow record for the traffic flow including the one or more metadata elements of the respective node level metadata set.

Figure 8:
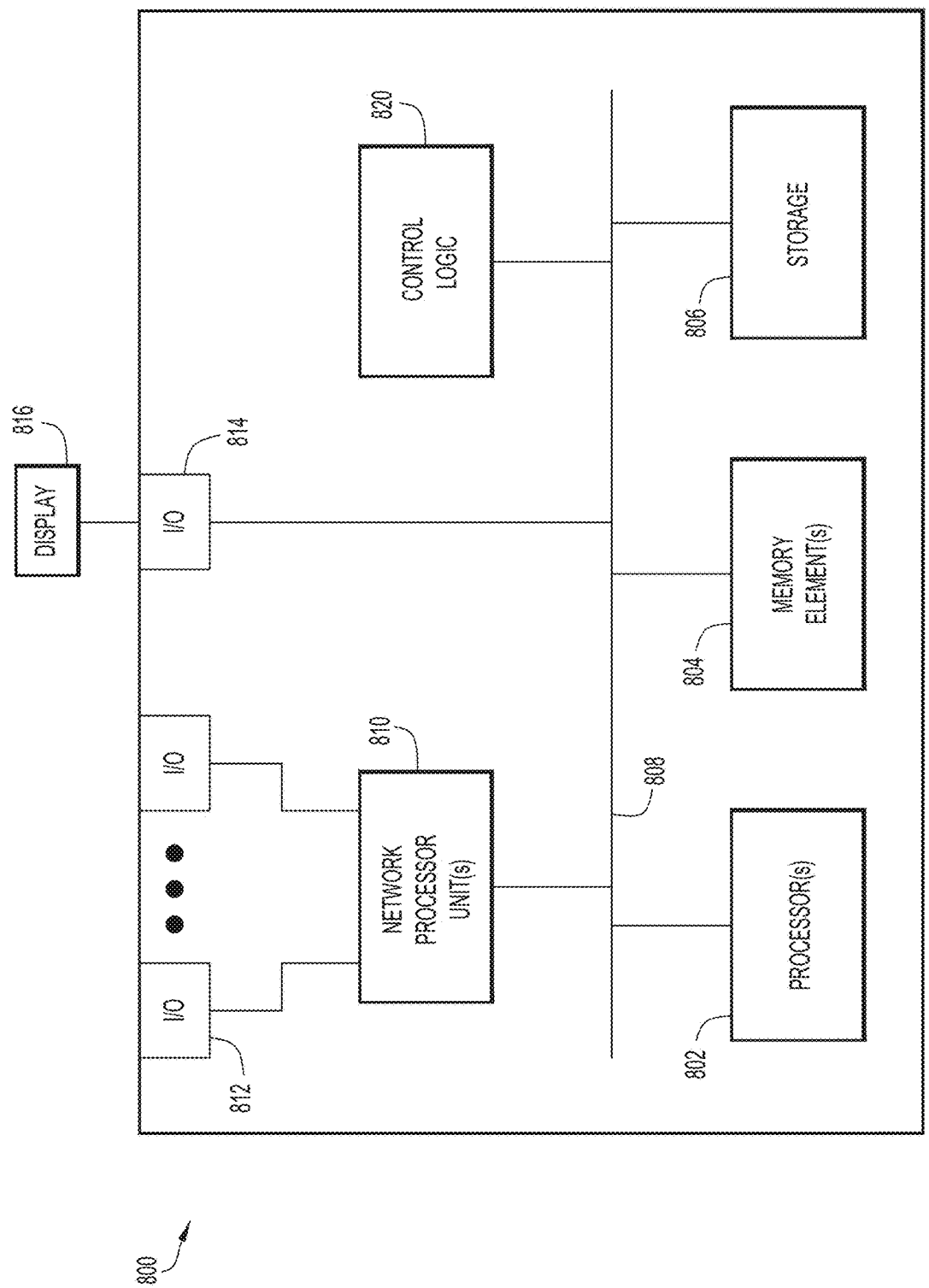
FIG. 8 is a hardware block diagram of a computing device that may perform functions associated with any combination of operations in connection with the techniques depicted and described in FIGS. 1-7, according to various example embodiments.

FIG. 8 is a hardware block diagram of a computing device 800 that may perform functions associated with any combination of operations in connection with the techniques depicted in FIGS. 1A-7, according to various example embodiments, including, but not limited to, operations of the one or more network devices 110*a-n* of FIG. 1A or 1B.

Further, the computing device 800 may be representative of one of the data source device 102, the data sink device 104, the telemetry collector 120, or the network controller 122 of FIG. 1A. It should be appreciated that FIG. 8 provides only an illustration of one example embodiment and does not imply any limitations with regard to the environments in which different example embodiments may be implemented. Many modifications to the depicted environment may be made.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 816, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a plurality of ports each configured to receive and send packets in a network and a processor. The processor is configured to perform various operations including obtaining, from one of the plurality of ports, a packet of a traffic flow, where the packet has a header and a payload. The operations further include adding, to the header of the packet, telemetry node level metadata while skipping at least one element of the telemetry node level metadata that is redundant to telemetry node level information of the traffic flow. The operations also include providing the packet to another one of the plurality of ports for transmission along a path in the network In yet another example embodiment, an apparatus is provided. The apparatus includes a plurality of ports each configured to receive and send packets in a network and a processor. The processor is configured to perform various operations. The operations include obtaining, from one of the plurality of ports, an export packet that includes a respective node level metadata set obtained from a plurality of network nodes along a path in a network traversed by a packet of a traffic flow. The operations further include determining one or more elements included in the respective node level metadata set based on a first instruction in the export packet that indicates one or more metadata elements that are being collected by the plurality of network nodes and a second instruction that indicates one or more skipped elements of the one or more metadata elements being collected. The one or more skipped elements are excluded from the respective node level metadata set. The operations further include extracting, from the export packet, the one or more elements determined to be included in the respective node level metadata set.

In yet another example embodiment, one or more non-transitory computer readable storage media encoded with instructions are provided. When the media is executed by a processor, the instructions cause the processor to execute a method that includes obtaining a packet of a traffic flow. The packet has a header and a payload. The method further includes adding, to the header of the packet, telemetry node level metadata while skipping at least one element of the telemetry node level metadata that is redundant to telemetry node level information of the traffic flow and providing the packet to a network device in a path of a network.

In yet another example embodiment, one or more non-transitory computer readable storage media encoded with instructions are provided. When the media is executed by a processor, the instructions cause the processor to execute another method that involves obtaining an export packet that includes a respective node level metadata set obtained from a plurality of network nodes along a path in a network traversed by a packet of a traffic flow. The method further involves determining one or more elements included in the respective node level metadata set based on a first instruction in the export packet that indicates one or more metadata elements that are being collected by the plurality of network nodes and a second instruction that indicates one or more skipped elements of the one or more metadata elements being collected, where the one or more skipped elements are excluded from the respective node level metadata set. The method further involves extracting, from the export packet, the one or more elements determined to be included in the respective node level metadata set.

In yet another example embodiment, a system is provided that includes the devices and operations explained above with reference to FIGS. 1A-8.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a first network device, a packet of a traffic flow, the packet having a header with an instructional bitmap and a payload;
    determining whether to add or omit each element of telemetry node level metadata based on the instructional bitmap;
    adding, by the first network device, to the header of the packet, the telemetry node level metadata comprising a plurality of collection data elements while omitting at least one collection data element of the telemetry node level metadata, which is indicated as to be added in the instructional bitmap, wherein the at least one collection data element is redundant to telemetry node level information of the traffic flow; and
    providing the packet to a second network device in a path of a network.

2. The method of claim 1, further comprising:
    storing, at the first network device, a flow data that includes the telemetry node level information for the traffic flow, wherein the flow data is generated based on the telemetry node level information obtained from a first packet in the traffic flow; and
    updating the telemetry node level information stored in the flow data based on changes in the telemetry node level metadata of subsequent packets in the traffic flow.

3. The method of claim 2, further comprising:
    collecting, by the first network device, the telemetry node level metadata, based on one or more instructions obtained by the first network device from the header of the packet, wherein the one or more instructions are written to the header of the packet by a source network device prior to obtaining the packet by the first network device; and
    determining whether first values of the plurality of collection data elements are different from second values of the telemetry node level information stored in the flow data, wherein the at least one collection data element that has the same value as the telemetry node level information is not added to the header of the packet.

4. The method of claim 1, further comprising:
    comparing, by the first network device, one or more first values of the telemetry node level metadata with corresponding one or more second values of the telemetry node level information stored at the first network device, wherein the corresponding one or more second values of the telemetry node level information are obtained from one or more previous packets of the traffic flow.

5. The method of claim 4, wherein adding the telemetry node level metadata includes:
    adding, to the header of the packet, a first element of the telemetry node level metadata having a different value from the telemetry node level information; and
    omitting a second element of the telemetry node level metadata that has the same value as the telemetry node level information.

6. The method of claim 5, further comprising:
    generating, by the first network device, an instructional mask that indicates that the first element of the telemetry node level metadata is added and that the second element of the telemetry node level metadata is omitted; and
    adding, by the first network device, the instructional mask to the header of the packet.

7. The method of claim 1, further comprising:
    determining, by the first network device, whether to check the telemetry node level metadata for the at least one collection data element that is redundant based on one or more instructions obtained by the first network device from the header of the packet, wherein the one or more instructions are written to the header of the packet by a source network device prior to obtaining the packet by the first network device.

8. The method of claim 7, wherein the one or more instructions are stored in an in-band network telemetry (INT) bitmap in the header of the packet and the INT bitmap includes a field for indicating whether to check the telemetry node level metadata for the at least one collection data element that is redundant.

9. The method of claim 7, wherein the one or more instructions are stored in an in-situ operation, administration, and maintenance (IOAM) trace type option of the header of the packet, and the IOAM trace type option includes a field for indicating whether to check the telemetry node level metadata for the at least one collection data element that is redundant.

10. The method of claim 1, wherein the telemetry node level metadata includes one or more of:
    one or more first identifiers of an ingress interface of the first network device;
    one or more second identifiers of an egress interface of the first network device;
    one or more hop latency values indicative of a traffic rate in the path in the network;
    one or more first occupancy values of an egress queue of the first network device that is configured to store a plurality of packets that are to be transmitted from the first network device on the path in the network;

one or more second occupancy values of a buffer of the first network device that is configured to store the plurality of packets being processed by the first network device; or one or more error transmission values.

11. The method of claim 1, further comprising:

adding, by the first network device, to the header of the packet, information indicating that the at least one collection data element of the telemetry node level metadata that is redundant to the telemetry node level information of the traffic flow is omitted.

12. The method of claim 1, further comprising:

generating an instructional mask that indicates that the at least one collection data element of the telemetry node level metadata of the first network device is omitted and adding the instructional mask to the header of the packet before providing the packet to the second network device along the path of the network.

13. The method of claim 1, wherein the header includes an optimization field with instructions to check for redundancy in the telemetry node level metadata, and wherein omitting the at least one collection data element at the first network device is enabled based on the optimization field.

14. A method comprising:

obtaining, by a network device, an export packet that includes a respective node level metadata set obtained from a plurality of network nodes along a path in a network traversed by a packet of a traffic flow, wherein the respective node level metadata set includes a plurality of collection data elements;

determining, by the network device, one or more elements included in the respective node level metadata set based on a first instruction in the export packet that indicates one or more metadata elements that are being collected by the plurality of network nodes and a second instruction that indicates one or more skipped elements of the one or more metadata elements that are indicated as being collected in the first instruction, wherein the one or more skipped elements are omitted from the respective node level metadata set to reduce a size of the packet; and extracting, from the export packet, by the network device, the one or more elements determined to be included in the respective node level metadata set.

15. The method of claim 14, further comprising:

processing, by the network device, the one or more elements extracted from the export packet to generate a configuration instruction for a respective network node of the plurality of network nodes, which generated the respective node level metadata set.

16. The method of claim 14, wherein determining the one or more elements of the respective node level metadata set includes:

extracting, from the export packet, the first instruction that indicates the one or more metadata elements collected by each of the plurality of network nodes;

extracting, from the respective node level metadata set, the second instruction that indicates the one or more skipped elements that are collected by a respective network node but are omitted from the respective node level metadata set generated by the respective network node; and comparing the first instruction with the second instruction to determine the one or more elements included in the respective node level metadata set.

17. The method of claim 16, wherein the one or more skipped elements have the same values as in a previous export packet that is obtained based on a previous packet of the traffic flow.

18. The method of claim 14, further comprising:

obtaining, by the network device, a first export packet that includes the respective node level metadata set obtained from each of the plurality of network nodes along the path in the network traversed by a first packet of the traffic flow; and generating, by the network device, for each of the plurality of network nodes, a flow record for the traffic flow comprising the one or more metadata elements of the respective node level metadata set.

19. An apparatus comprising:

a plurality of ports each configured to receive and send packets in a network; and a processor, wherein the processor is configured to perform operations comprising:

obtaining, from one of the plurality of ports, a packet of a traffic flow, the packet having a header with an instructional bitmap and a payload;

determining whether to add or omit each element of telemetry node level metadata based on the instructional bitmap;

adding, to the header of the packet, the telemetry node level metadata comprising a plurality of collection data elements while omitting at least one collection data element of the telemetry node level metadata, which is indicated as to be added in the instructional bitmap, wherein the at least one collection data element is redundant to telemetry node level information of the traffic flow; and providing the packet to another one of the plurality of ports for transmission along a path in the network.

20. The apparatus of claim 19, wherein the processor is further configured to perform:

storing, in a memory, a flow data that includes the telemetry node level information for the traffic flow, wherein the flow data is generated based on the telemetry node level information obtained from a first packet in the traffic flow; and updating the telemetry node level information stored in the flow data based on changes in the telemetry node level metadata of subsequent packets in the traffic flow.

* * * * *